(12) United States Patent
Kitamura et al.

(10) Patent No.: US 7,208,714 B2
(45) Date of Patent: Apr. 24, 2007

(54) OPTICAL DISPLACEMENT SENSOR AND EXTERNAL FORCE DETECTING DEVICE

(75) Inventors: Atsushi Kitamura, Shizuoka-ken (JP); Shigeyuki Adachi, Shizuoka-ken (JP)

(73) Assignee: Minebea Co., Ltd., Nagano-ken (JP)

(*) Notice: Subject to any disclaimer, the term of this patent is extended or adjusted under 35 U.S.C. 154(b) by 54 days.

(21) Appl. No.: 10/929,185

(22) Filed: Aug. 30, 2004

(65) Prior Publication Data
US 2005/0051714 A1    Mar. 10, 2005

(30) Foreign Application Priority Data
Sep. 9, 2003    (JP)    ............... 2003-316478

(51) Int. Cl.
G01C 21/02    (2006.01)
G01C 21/24    (2006.01)

(52) U.S. Cl. .................. 250/206.1; 250/221

(58) Field of Classification Search ......... 250/221, 250/231.1, 208.2, 208.6, 206.1; 345/161, 345/156, 157; 356/614
See application file for complete search history.

(56) References Cited

U.S. PATENT DOCUMENTS 5,694,153 A * 12/1997 Aoyagi et al. .............. 345/161

6,606,798 B2 * 8/2003 El-Katcha et al. ............ 33/290

FOREIGN PATENT DOCUMENTS

| JP | 04-39741 | 6/1987 |
| JP | 63-182623 | 7/1988 |
| JP | 2003-245028 | 10/1991 |

* cited by examiner

Primary Examiner—Stephone B. Allen
Assistant Examiner—Suezu Ellis
(74) Attorney, Agent, or Firm—McDermott Will & Emery LLP (57) ABSTRACT

An optical displacement sensor comprises: a light source; a light receiving means adapted to receive light emitted from the light source; and a light diffracting element disposed between the light source and the light receiving means. The light receiving means include a first light receiving element group centrally located, and a second light receiving element group constituted by two separate clusters disposed so as to sandwich the first light receiving element group, and the light diffracting element functions to diffract the light emitted from the light source along one direction of the two-axis directions into a zero-order beam to be received at the first light receiving element group, and higher-order beams received at the second light receiving element group.

9 Claims, 8 Drawing Sheets

OPTICAL DISPLACEMENT SENSOR AND EXTERNAL FORCE DETECTING DEVICE

This application claims priority from Japanese Application No. 2003-316478, filed Sep. 9, 2003 (incorporated by reference herein).

BACKGROUND OF THE INVENTION

1. Field of the Invention

The present invention relates to an optical displacement sensor and an external force detecting device, and particularly to an optical displacement sensor which detects relative displacement between a reference object and a measurement object based on displacement of a light reception position, and further to an external force detecting device which detects an external force applied to the measurement object based on a signal outputted from the optical displacement sensor.

2. Description of the Related Art

An external force detecting device, such as a six-axis optical force sensor, is conventionally known, in which a displacement amount of an action section to receive an external force, namely a measurement object, relative to a support section to support the action section, namely a reference object, is detected by an optical displacement sensor, and an external force applied to the action section is measured according to an output signal from the optical displacement sensor.

For example, a six-axis optical force sensor comprises optical displacement sensors to measure a six-axis direction displacement, based on which a six-axis force is calculated. Specifically, such a six-axis optical force sensor comprises three optical displacement sensors, each of which uses an optical sensor unit and is capable of measuring a two-axis (X and Y) direction displacement, thereby enabling measurement of a six-axis direction displacement. The optical sensor unit comprises a light emitting diode (LED) as a light source and a photodiode (PD) assembly as a light receiving element, such that the LED opposes the PD assembly with their respective optical central axes aligned to each other. The PD assembly is composed of four PD's and receives light emitted from the LED at its center area equally shared by the four PD's, whereby displacement of light receiving position at the PD assembly, that is to say relative positional displacement between a component attached to the LED and a component attached to the PD assembly can be detected in the optical displacement sensor. In the six-axis optical force sensor, a six-axis force applied between the component attached to the LED and the component attached to the PD assembly is measured according to an output signal from each of the optical displacement sensors.

Figure 1:
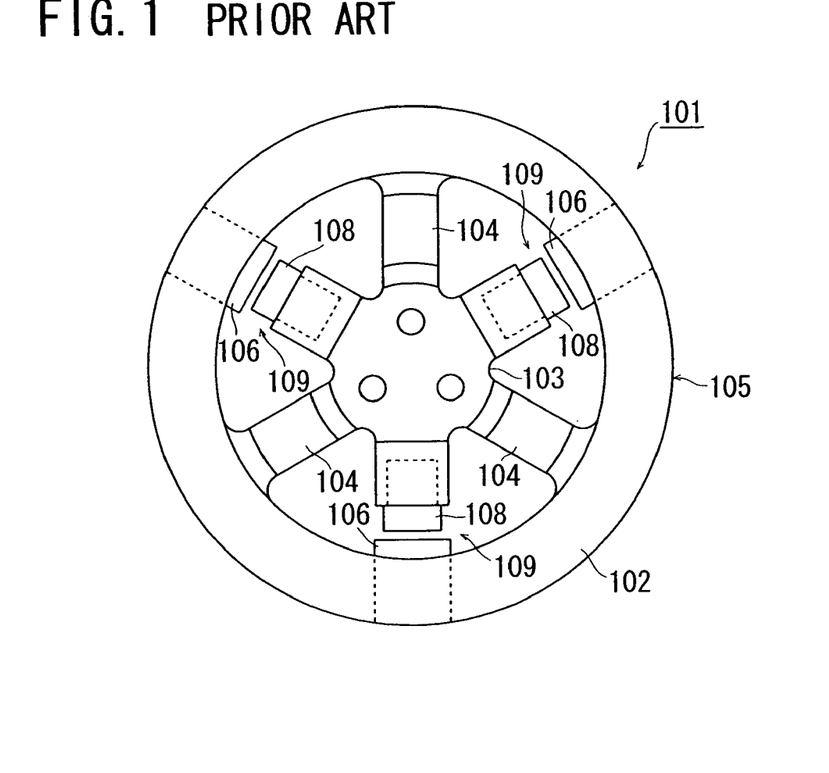
FIG. 1 is a plan view of a conventional six-axis force sensor.

FIG. 1 is a plan view of a conventional six-axis force sensor as disclosed in Japanese Patent Application Laid-Open No. H03-245028. A six-axis force sensor 101 shown in FIG. 1 is structurally composed of a cylindrical main body, and top and bottom lids (not shown). The main body is constituted basically by a frame 105, which integrally includes: a cylindrical support section 102; an action section 103 located centrally inside the support section 102 and adapted to receive an external force; and three elastic spoke sections 104 crookedly structured so as to be duly deformed elastically in all directions and supportably connecting the action section 103 to the support section 102. The frame 105 is made of a single piece of an aluminum alloy material and shaped by cutting and electric discharge machining. The support section 102 and the action section 103 are fixedly attached respectively to two components to which a measurement force is applied, and when a force applied acts on the six-axis force sensor 101 structured as described above, a micro-displacement with respect to three-axis direction and a micro-rotation with respect to three-axis rotational direction are generated between the support section 102 and the action section 103.

The six-axis force sensor 101 further includes three light sources 106 disposed at the inner circumference of the support section 102 at 120 degree intervals (i.e. at an equi-angular distance), and three optical sensors (light receiving elements) 108 disposed at the action section 103 at 120 degree intervals (i.e. at an equi-angular distance) so as to oppose respective three light sources 106 with mutual optical axes aligned to each other. Each optical sensor 108 and each light source 106 disposed opposite to the optical sensor 108 make up an optical sensor unit (optical displacement sensor) 109.

Figure 2:
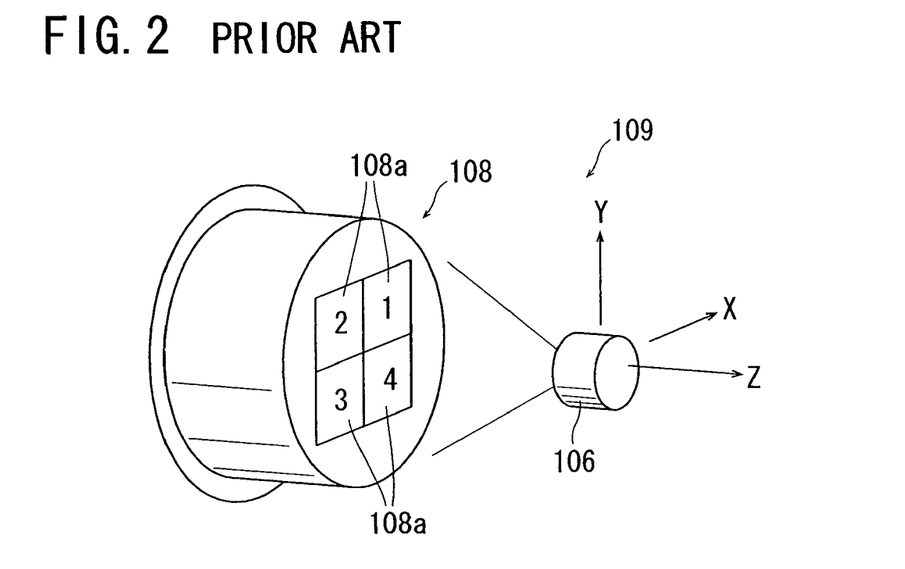
FIG. 2 is an explanatory perspective view of a conventional optical sensor unit (optical displacement sensor) shown in FIG. 1.

FIG. 2 is an explanatory perspective view of the optical sensor unit (optical displacement sensor) 109 of FIG. 1. As shown in FIG. 2, each of the optical sensors 108 is constituted by a PD assembly composed of four PD's 108a. The light sources 106 disposed so as to oppose respective optical sensors 108 are each constituted by an infrared high-intensity LED with a pinhole aperture provided at its front face, and light emitted from the LED 106 and passing through the pinhole aperture propagates diffusedly and impinges on the center portion of the optical sensor 108 so as to be substantially equally irradiated on all the four PD's 108a. If the support section 102 and the action section 103 are displaced relative to each other by an external force, then the light emitted from the LED 106 is irradiated unequally on the four PD's 108a, and light amounts received at respective four PD's 108a are measured for calculation of relative displacements with respect to X- and Y-axis directions. And, the six-axis force sensor 101 calculates forces with respect to six-axis directions according to the above-calculated relative displacements, and a signal is outputted therefrom.

However, the aforementioned conventional optical displacement sensor, and the aforementioned six-axis force sensor, i.e., external force detecting device, incorporating the conventional optical displacement sensor has the following problems when respective optical axes of the LED 106 as the light source, and PD assembly 108 to receive light emitted from the LED 106 are aligned to each other. Specifically, in the alignment work, while positional adjustment with respect to the X- and Y-axis directions is easy, rotational adjustment about a Z-axis perpendicular to the X- and Y-axes (to precisely bring the cross-shaped boundary formed by the four PD's 108a in line with the X- and Y-axes) is very difficult Conventionally, the rotational adjustment has to be carried out such that an LED and a PD assembly are tentatively arranged, and misalignment in the rotational direction about the Z-axis is checked and corrected based on a signal from the PD assembly, which is gained by causing an action section at which either the LED or the PD assembly is disposed to be displaced in the X- and Y-axis directions. This involves a lot of works, and requires an immense amount of time and effort, especially when displacement amount is large.

SUMMARY OF THE INVENTION

The present invention has been made in light of the above problem, and it is an object of the present invention to provide an optical displacement sensor, and an external force detecting device, in which a position of a light receiving means relative to a light source with respect to a rotational direction about an optical axis of light emitted from the light source can be adjusted easily in a reduced time.

In order to achieve the above object, according to a first aspect of the present invention, an optical displacement sensor comprises: a light source disposed at one of a reference object and a measurement object; a light receiving means disposed at the other one thereof at which the light source is not disposed, and adapted to receive light emitted from the light source thereby measuring displacement of the measurement object relative to the reference object with respect to two-axis directions in a plane perpendicular to an optical axis of the light emitted from the light source; and a light diffracting element disposed between the light source and the light receiving means. The light receiving means includes a first light receiving element group centrally located, and a second light receiving element group constituted by two separate clusters disposed so as to sandwich the first light receiving element group, and the light diffracting element functions to diffract the light emitted from the light source into a zero-order beam, and higher-order beams along one direction of the two-axis directions, such that the zero-order beam is received at the first light receiving element group, and the higher-order beams are received at the second light receiving element group.

According to a second aspect of the present invention, an optical displacement sensor comprises: a light source disposed at one of a reference object and a measurement object; and a light receiving means disposed at the other one thereof at which the light source is not disposed, and adapted to receive light emitted from the light source thereby measuring displacement of the measurement object relative to the reference object with respect to two-axis directions in a plane perpendicular to an optical axis of the light emitted from the light source. The light emitted from the light source, at least when received at the light receiving means, has its intensity distribution shaped in an oval configuration with two symmetry axes oriented so as to match the two-axis directions, respectively, with respect to which the displacement of the measurement object relative to the reference object is measured.

According to a third aspect of the present invention, an optical displacement sensor comprises: a light source disposed at one of a reference object and a measurement object; a reflector member disposed at the other one thereof at which the light source is not disposed; a light receiving means disposed at the one object at which the light source is disposed, and adapted to receive light which is emitted from the light source and which impinges on the reflector member to be reflected backward, thereby measuring displacement of the measurement object relative to the reference object with respect to two-axis directions in a plane perpendicular to an optical axis of the light emitted from the light source,; and a light diffracting element disposed at an optical path from the light source to the light receiving means via the reflector member. The light receiving means includes a first light receiving element group centrally located, and a second light receiving element group constituted by two separate clusters disposed so as to sandwich the first light receiving element group, and the light diffracting element functions to diffract the light emitted from the light source into a zero-order beam, and higher-order beams along one direction of the two-axis directions, such that the zero-order beam is received at the first light receiving element group, and the higher-order beams are received at the second light receiving element group.

According to a fourth aspect of the present invention, an optical displacement sensor comprises: a light source disposed at one of a reference object and a measurement object; a reflector member disposed at the other one thereof at which the light source is not disposed; and a light receiving means disposed at the one object at which the light source is disposed, and adapted to receive light which is emitted from the light source and which impinges on the reflector member to be reflected backward, thereby measuring displacement of the measurement object relative to the reference object with respect to two-axis directions in a plane perpendicular to an optical axis of the light emitted from the light source. The light emitted from the light source, at least when received at the light receiving means, has its intensity distribution shaped in an oval configuration with two symmetry axes oriented so as to match the two-axis directions, respectively, with respect to which the displacement of the measurement object relative to the reference object is measured.

In the second or fourth aspect of the present invention, the light source may be constituted by a light emitting diode (LED), and a cylindrical lens may be disposed between the LED and the light receiving means whereby the light emitted from the LED has its intensity distribution turned into the oval configuration with two symmetry axes.

In the first to fourth aspects of the present invention, the light receiving means may be structured to be rotatable about the first light receiving element group.

According to a fifth aspect of the present invention, there is provided a method of adjusting such an optical displacement sensor as structured according to the first aspect of the present invention. The method comprises a step of adjusting a position of the light receiving means relative to the light source with respect to a rotational direction about the optical axis of the light emitted from the light source based on a reception state of the higher-order beams at the second light receiving element group. Consequently, the optical displacement sensor can be adjusted without troublesome work in a reduced time.

According to a sixth aspect of the present invention, there is provided a method of adjusting such an optical displacement sensor as structured according to the second aspect of the present invention. The method comprises a step of adjusting a position of the light receiving means relative to the light source with respect to a rotational direction about the optical axis of the light emitted from the light source based on a reception state of the light at the light receiving means. Consequently, the optical displacement sensor can be adjusted easily without provision of the light diffracting element and the second light receiving element group used in the first aspect.

According to a seventh aspect of the present invention, there is provided a method of adjusting such an optical displacement sensor as structured to the third aspect of the present invention. The method comprises a step of adjusting a position of the light receiving means relative to the light source with respect to a rotational direction about the optical axis of the light emitted from the light source based on a reception state of the higher-order beams at the second light receiving element group. Consequently, the optical displacement sensor structured to include the reflector member can be also adjusted without troublesome work in a reduced time.

According to an eighth aspect of the present invention, there is provide a method of adjusting such an optical displacement sensor as structured according to the fourth aspect of the present invention. The method comprises a step of adjusting a position of the light receiving means relative to the light source with respect to a rotational direction about the optical axis of the light emitted from the light source based on a reception state of the light at the light receiving means. Consequently, the optical displacement sensor provided with the reflector member can be adjusted easily without provision of the light diffracting element and the second light receiving element group used in the third aspect.

According to a ninth aspect of the present invention, an external force detecting device is provided which incorporates an optical displacement sensor structured according to any one of the aforementioned first to fourth aspects, and an external force applied to a measurement object is detected based on a signal containing a measurement result by the optical displacement sensor. In the ninth aspect of the present invention, the optical displacement sensor may be provided in a plural number, and a plurality of optical displacement sensors may detect respective displacements with respect to two-axis directions different from one another. Since the external force detecting device incorporates the optical displacement sensors according to the present invention, the adjustment work about the device can be performed easily in a reduced time.

BRIEF DESCRIPTION OF THE DRAWINGS

FIGS. 5A to 5F are explanatory views of adjustment in a rotational direction about a Z-axis performed based on positional relation between the light receiving face of the PD assembly of FIG. 4 and respective beams (zero-order beam, +first-order beam, and −first-order beam), wherein FIG. 5A to 5C show positional relation examples, and FIG. 5D to 5F show adjustment directions about the Z-axis in respective positional relations shown by FIGS. 5A to 5C;

FIGS. 9A to 9F are explanatory views of adjustment in a rotational direction about a Z-axis performed based on positional relation between the light receiving face of the PD assembly of FIG. 8 and respective beams (zero-order beam, +first-order beam, and −first-order beam), wherein FIG. 9A to 9C show positional relation examples, and FIG. 9D to 9F show adjustment direction about the Z-axis in respective positional relations shown by FIGS. 9A to 9C.

DETAILED DESCRIPTION OF THE PREFERRED EMBODIMENTS

Preferred embodiments of the present invention will hereinafter be described with reference to the accompanying drawings. In the embodiments described below, an optical displacement sensor according to the present invention is applied to such a six-axis optical force sensor as shown in FIG. 1, but the present invention is not limited to application to an external force detecting device for detecting six-axis force.

Figure 3:
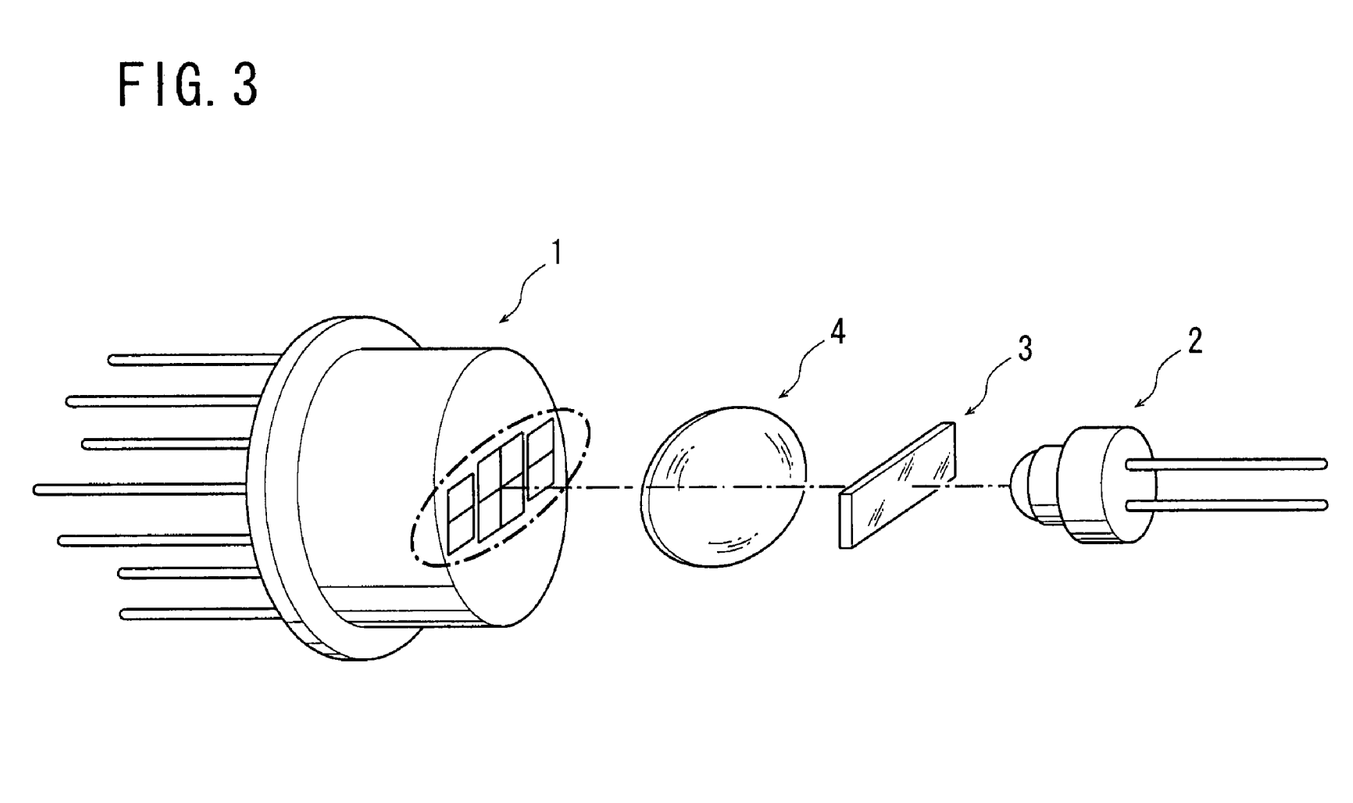
FIG. 3 is an explanatory perspective view of a structure of an optical displacement sensor according to a first embodiment of the present invention.

A first embodiment of the present invention will be described with reference to FIGS. 3 to 6. Referring first to FIG. 3, an optical displacement sensor comprises: a photodiode (PD) assembly 1 as a light receiving means; a light emitting diode (LED) 2 which is a light emitting element as a light source; a light diffracting element 3 to disperse one beam into three beams; and a lens 4 to shape and condense beams.

In the optical displacement sensor shown in FIG. 3, the PD assembly 1 is mounted at one of a reference object and a measurement object, and the LED 2 is mounted at the other one thereof, at which the PD assembly 1 is not mounted, wherein light emitted from the LED 2 is received at the PD assembly 1, and the positional displacement of the measurement object relative to the reference object with respect to two-axis directions in a plane perpendicular to the optical axis of the light emitted from the LED 2 is measured on the basis of the state of light reception at the PD assembly 1. This applies to optical displacement sensors according to other embodiments of the present invention shown in FIGS. 2 and 10.

The light emitted from the LED 2 is dispersed by the light diffracting element 3 into three beams. Here, the three beams are respectively referred to as; a zero-order beam that is positioned at the middle; a +first-order beam that is positioned on the right when facing the light receiving face of the PD assembly 1; and a −first-order beam that is positioned on the left when facing the light receiving face of the PD assembly 1.

The light diffracting element 3 must be preliminarily subjected to angular adjustment so that the three beams, specifically the zero-order beam, the +first-order beam, and the −first-order beam are aligned strictly in a straight line in either an X-axis or a Y-axis direction. In the present embodiment, the +first-order beam, and the −first-order beam are used for explanation, but higher-order diffracted light beams may alternatively be used.

Figure 4:
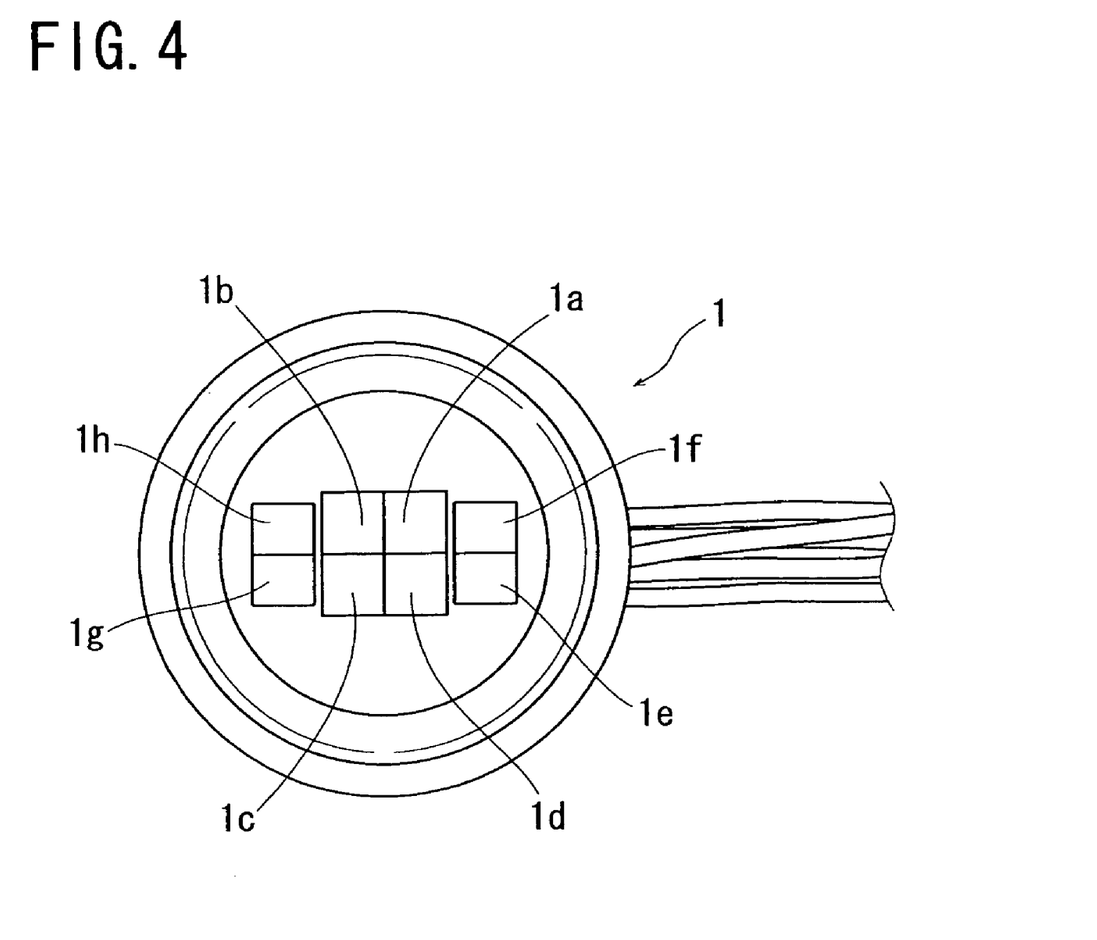
FIG. 4 is a plan view of a light receiving face of a PD assembly shown in FIG. 3.

The PD assembly 1 shown in FIG. 3 has eight PD's arranged at its light receiving face (encircled by a chain line). The PD assembly 1 is shown in detail in FIG. 4. Referring to FIG. 4, the aforementioned eight PD's (1a to 1h) are arranged at the light receiving face of the PD assembly 1, and light emitted from the LED 2 falls incident on the light receiving face. The PD's 1a, 1b, 1c and 1d constitute a first light receiving element group, and the PD's 1e, 1f, 1g and 1h constitute a second light receiving element group consisting of two isolated clusters sandwiching the first light receiving element group. The optical axis of the light incident on the light receiving face is oriented perpendicular to the light receiving face, and it is preferred that the center of the zero-order beam be positioned at the center of an area occupied by the PD's 1a to 1d (the first light receiving element group), the center of the +first-order beam be positioned at the center of an area occupied by the PD's 1e and 1f (one cluster of the second light receiving element group), and that the center of the −first-order beam be positioned at the center of an area occupied by the PD's 1g and 1h (the other cluster of the second light receiving element group). In the optical displacement sensor according to the first embodiment, rotational adjustment around a Z-axis (oriented perpendicular to the light receiving face of the PD assembly 1) is performed based on positional relation between the above-described light receiving face of the PD assembly 1 and respective beams (the zero-order, +first-order, and −first-order beams).

Figure 5A:
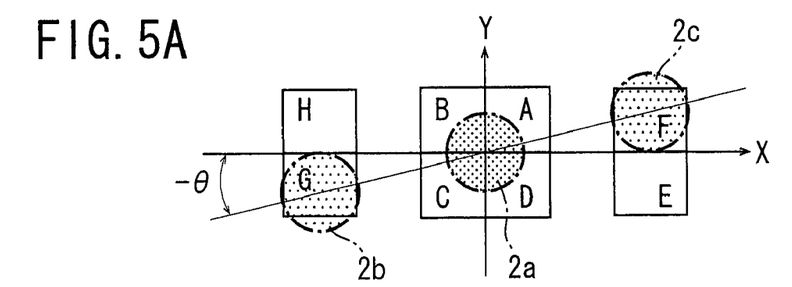
Figure 5B:
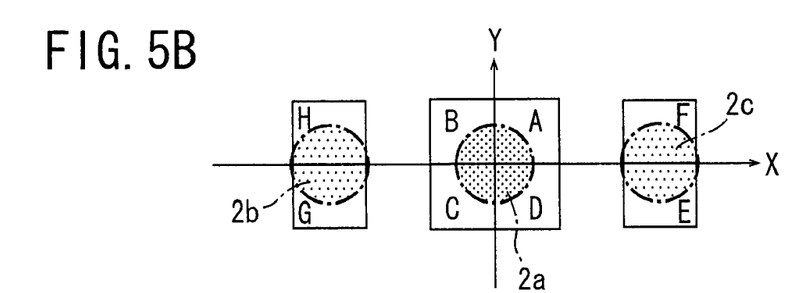
Figure 5C:
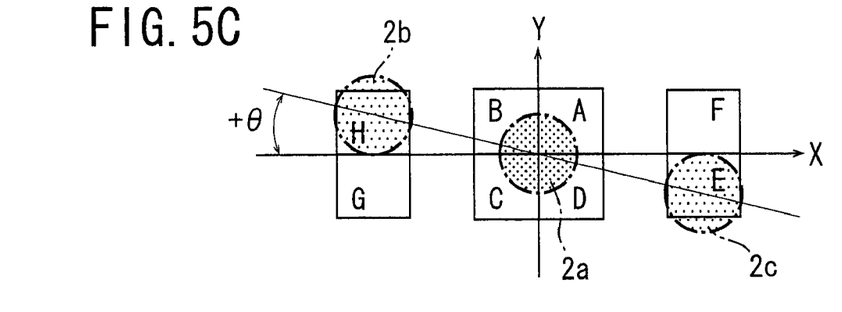

A method of rotational adjustment about the Z-axis will be described with reference to FIGS. 5A to 5F. Referring first to FIGS. 5A to 5C, the zero-order, −first-order beam, and +first-order beams are denoted by 2a, 2b and 2c, respectively. And, symbols A to H in FIGS. 5A to 5F denote intensities of lights received at the PD's 1a to 1h, respectively. In the first embodiment, the positional relation between the PD assembly 1 and the LED 2 is adjusted with respect to rotational direction about the Z-axis based on difference between the total of the intensities F and G and the total of the intensities E and H. This adjustment is preferably performed by rotating the PD assembly 1 which is structured to be rotatable about the center of the first light receiving element group, specifically the PD's 1a to 1d.

Figure 5D:
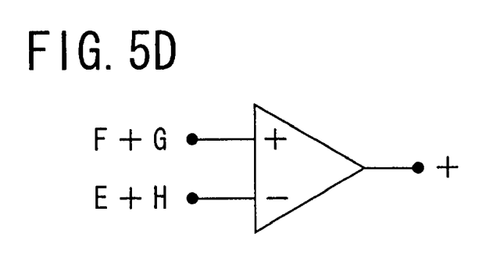

When the zero-order beam 2a, the −first-order beam 2b, and the +first-order beam 2c impinge on the PD assembly 1 as shown by FIG. 5A, the total intensity of F+G minus the total intensity of E+H leaves a positive value as shown by FIG. 5D. In such a case, the PD assembly 1 is rotated in a direction so as to cancel −θ shown in FIG. 5A.

Figure 5E:
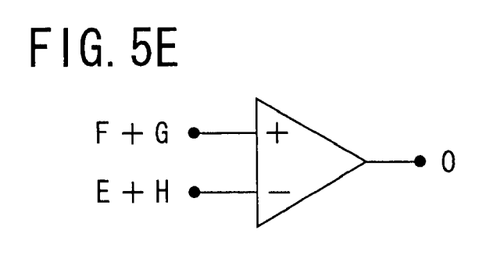

When the zero-order beam 2a, the −first-order beam 2b, and the +first-order beam 2c impinge on the PD assembly 1 as shown by FIG. 5B, the total intensity of F+G minus the total intensity of E+H leaves a zero value as shown by FIG. 5E. This indicates that the PD assembly 1 and the LED 2 are appropriately positioned to each other with respect to the rotational direction about the Z-axis, and the PD assembly 1 does not have to be rotated in either direction.

Figure 5F:
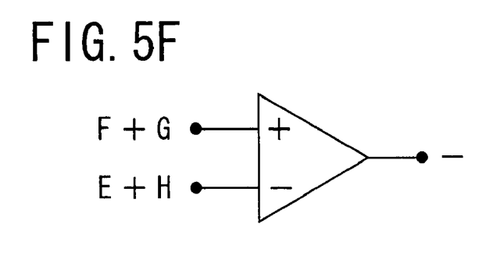

When the zero-order beam 2a, the −first-order beam 2b, and the +first-order beam 2c impinge on the PD assembly 1 as shown by FIG. 5C, the total intensity of F+G minus the total intensity of E+H leaves a negative value as shown by FIG. 5F. In such a case, the PD assembly 1 is rotated in a direction so as to cancel +θ shown in FIG. 5C.

Figure 6:
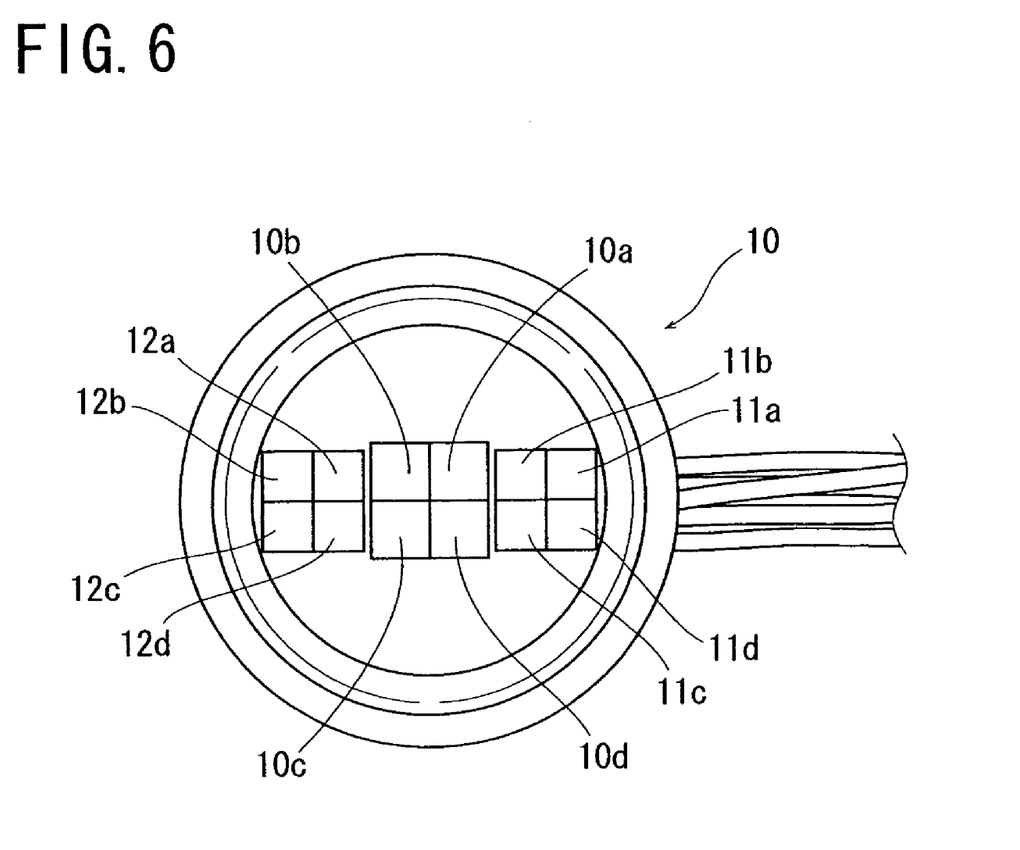
FIG. 6 is a plan view of a light receiving face of another PD assembly different from that shown in FIG. 4.

FIG. 6 shows another PD assembly 10 for the first embodiment, which replaces the PD assembly 1 shown in FIG. 4. The PD assembly 10 has PD's 10a to 10d, in place of the PD's 1a to 1d, which constitute a first light receiving element group, PD's 11a to 11d, in place of the PD's 1e and 1f, which constitute one cluster of a second light receiving element group, and PD's 12a to 12d, in place of the PD's 1g and 1h, which constitute another cluster of the second light receiving element group. In the embodiment, the second light receiving element group may be constituted any number of PD's provided that two clusters thereof sandwiching the first light receiving element group respectively have a plurality of PD's. The PD assembly 10 and the LED 2 can be positioned to each other with respect to rotational direction about the Z-axis following the method explained with reference to FIGS. 5A to 5F.

Figure 7:
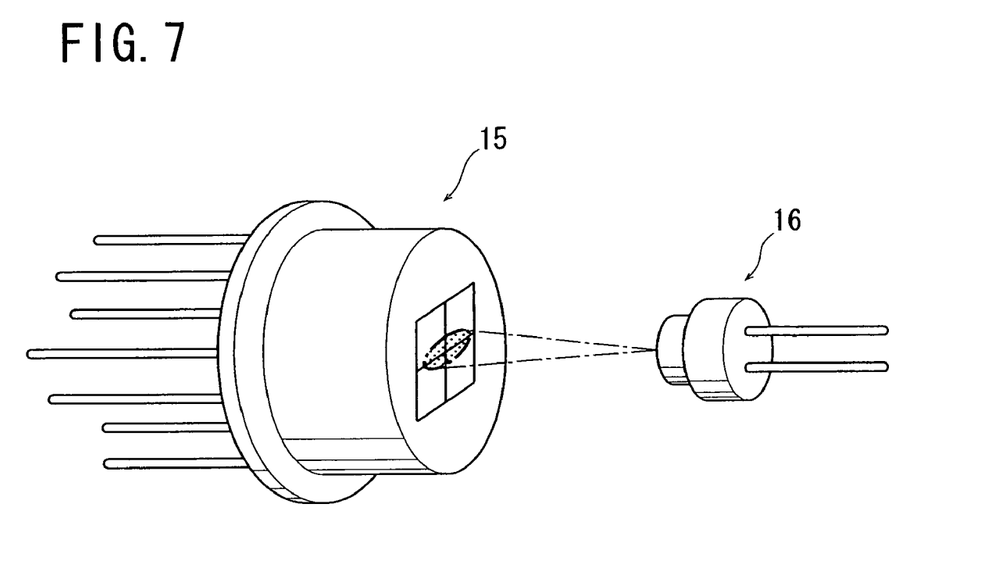
FIG. 7 is an explanatory perspective view of a structure of an optical displacement sensor according to a second embodiment of the present invention.

A second embodiment of the present invention will be described with reference to FIGS. 2, 8, and 9A to 9F. Referring to FIG. 7, an optical displacement sensor according to the second embodiment comprises a PD assembly 15 as a light receiving means, and a laser source 16 as a light source. Light emitted from the laser source 16 has its light intensity distribution shaped oval in cross section with two axes of symmetry crossing at right angles, and this distribution shape is leveraged into the optical displacement sensor according to the second embodiment.

Figure 8:
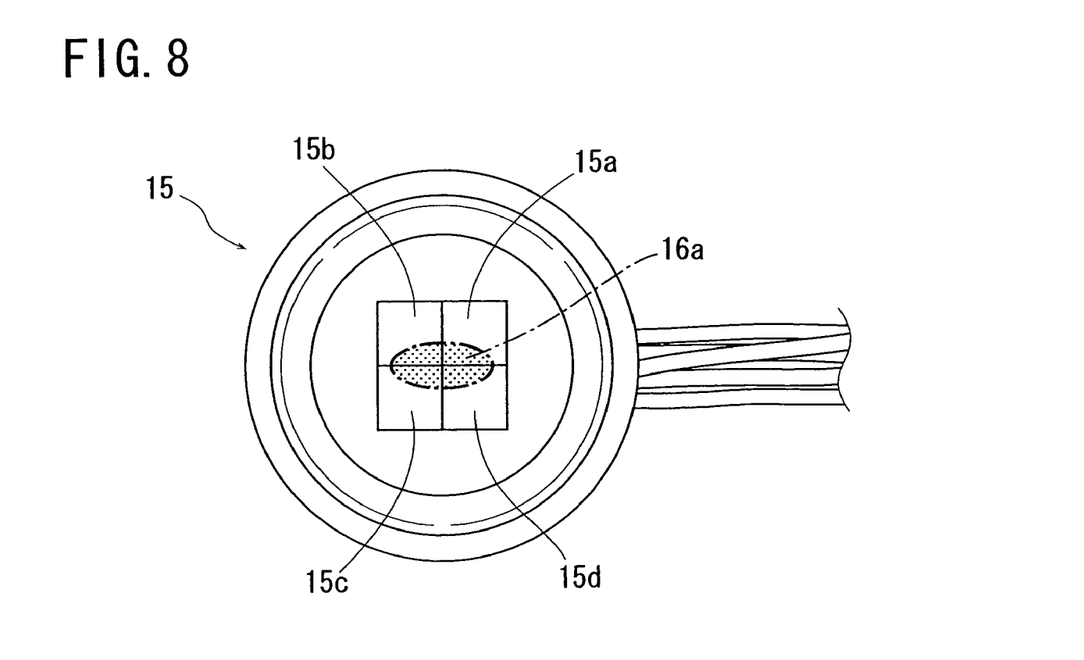
FIG. 8 is a plan view of a light receiving face of a PD assembly shown in FIG. 7.

Referring to FIG. 8, the PD assembly 15 is of a conventional structure, specifically has four PD's 15a to 15d arranged at its light receiving face, and light 16a emitted from the laser source 16 impinges on the light receiving face of the PD assembly 15. The optical axis of the light 16a is oriented perpendicular to the light receiving face, and it is preferred that the center of the light 16a be positioned at the center of an area occupied by the PD's 15a to 15d so that respective light intensities at the PD's 15a to 15d are equal to one another. In the optical displacement sensor according to the second embodiment, rotational adjustment about a Z-axis (oriented perpendicular to the light receiving face of the PD assembly 15) is performed based on positional relation between the above-described light receiving face of the PD assembly 15 and the light 16a.

A method of rotational adjustment about the Z-axis will be described with reference to FIGS. 9A to 9F, wherein symbols A to D denote intensities of lights received at the PD's 15a to 15d, respectively. In the second embodiment, the positional relation of the PD assembly 15 relative to the laser source 16 with respect to rotational direction about the Z-axis is adjusted based on difference between the total of the intensities A and C and the total of the intensities B and D. This adjustment is preferably performed by rotating the PD assembly 15 which is structured to be rotatable about the center of the first light receiving element group, specifically the PD's 15a to 15d.

Figure 9A:
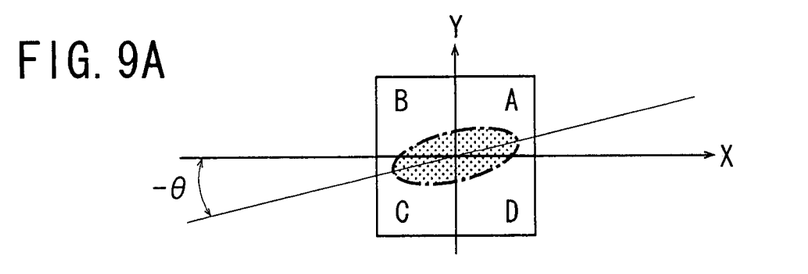
Figure 9B:
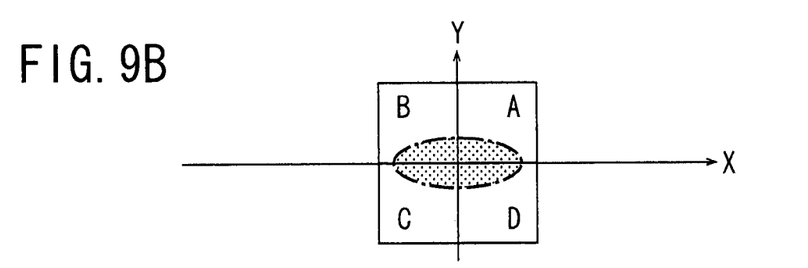
Figure 9C:
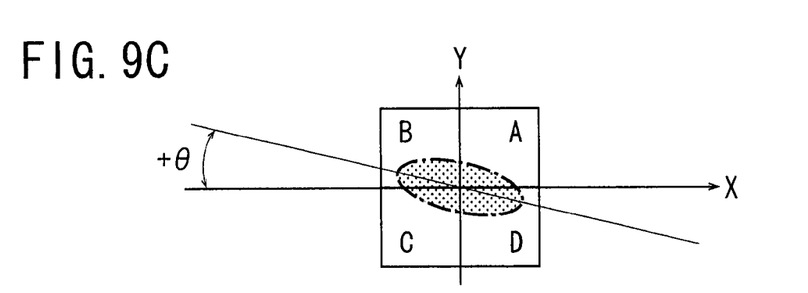
Figure 9D:
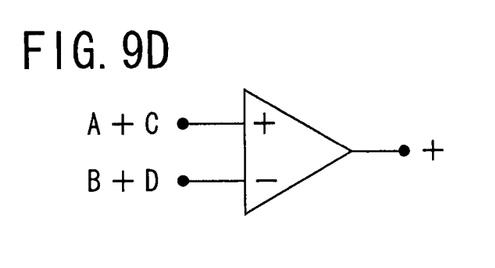

When the light 16a impinges on the PD assembly 15 as shown by FIG. 9A, the total intensity of A+C minus the total intensity of B+D leaves a positive value as shown by FIG. 9D. In such a case, the PD assembly 15 is rotated in a direction so as to cancel −θ shown in FIG. 9A.

Figure 9E:
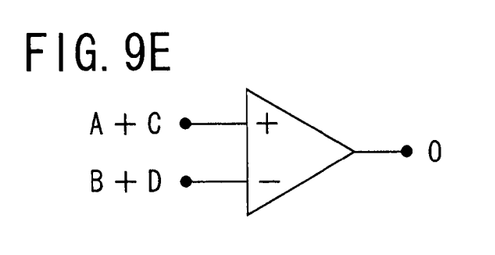

When the light 16a impinges on the PD assembly 15 as shown by FIG. 9B, the total intensity of A+C minus the total intensity of B+D leaves a zero value as shown by FIG. 9E. This indicates that the PD assembly 15 and the laser 16 are appropriately positioned to each other with respect to the rotational direction about the Z-axis, and the PD assembly 15 does not have to be rotated in either direction.

Figure 9F:
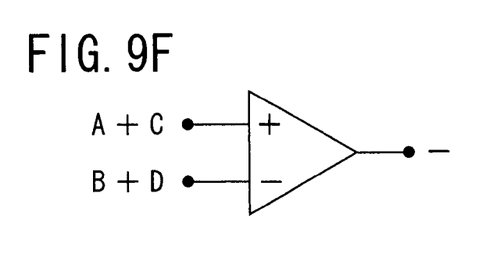

When the light 16a impinges on the PD assembly 15 as shown by FIG. 9C, the total intensity of A+C minus the total intensity of B+D leaves a negative value as shown by FIG. 9F. In such a case, the PD assembly 15 is rotated in a direction so as to cancel +θ shown in FIG. 9C.

Figure 10:
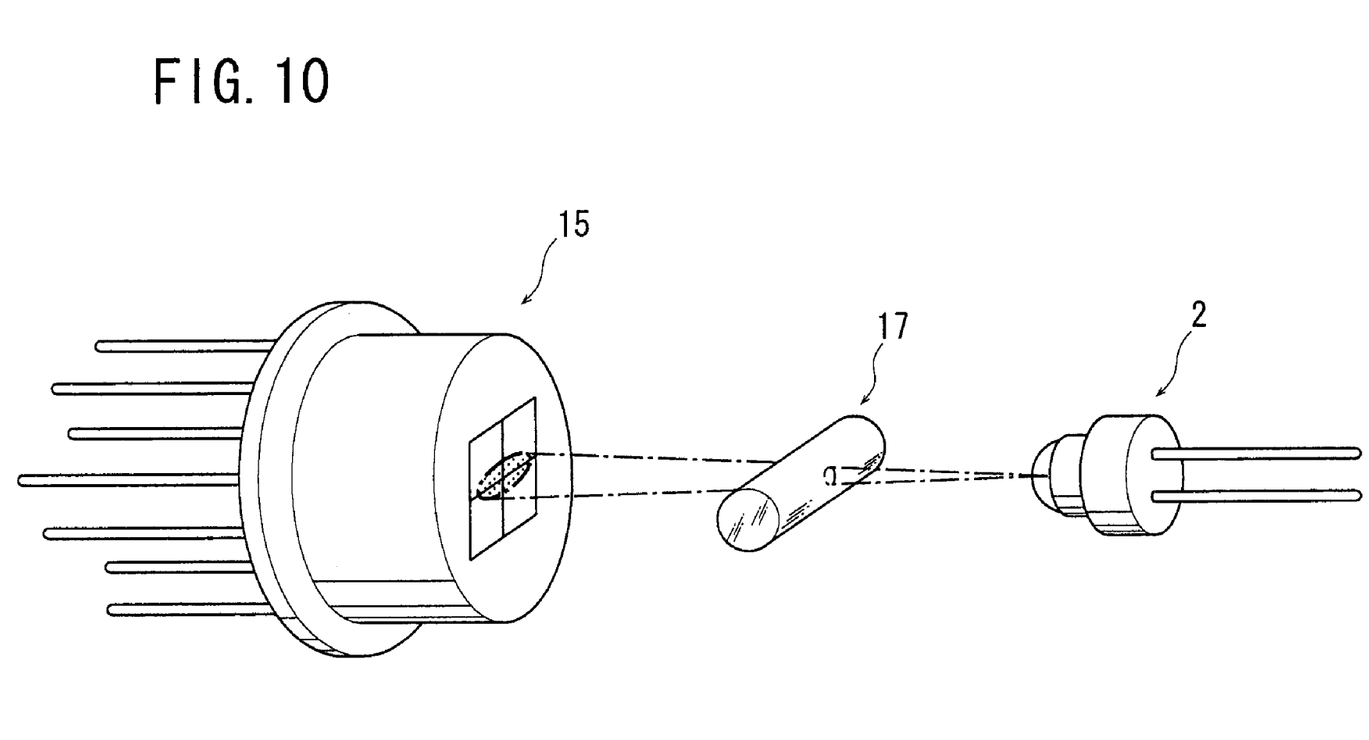
FIG. 10 is an explanatory perspective view of a structure of an optical displacement sensor according to a third embodiment of the present invention.

A third embodiment of the present invention will be described with reference to FIG. 10. An optical displacement sensor according to the third embodiment comprises a PD assembly 15 (same as employed in the second embodiment) as a light receiving means, an LED 2 (same as employed in the first embodiment) which is a light emitting element as a light source, and a cylindrical lens 17 disposed between the PD assembly 15 and the LED 2.

Light emitted from the LED 2, which originally is not shaped oval in cross section, has its cross section modified into an oval configuration with two axes of symmetry when passing through the cylindrical lens 17, and is received at the light receiving face of the PD assembly 15. Since the PD assembly 15 is structured in the same way as in the second embodiment, and since the light received by the PD assembly 15 has an oval cross section like in the second embodiment, rotational adjustment about the Z-axis can be performed following the method described in the second embodiment, and an explanation thereof is omitted.

In the foregoing embodiments, a light receiving means is mounted at one of a reference object and a measurement object, and a light source is mounted at the other one thereof, but the present invention is not limited to this structure but may be applied to a structure which is disclosed in Japanese Patent Application No. 2003-299827 by the present inventors, filed claiming priority to Japanese Patent Application No. 2003-141421, and in which both a light receiving means and a light source are mounted together at one of a reference object and a measurement object, and a reflector is mounted at the other one thereof at which the light receiving means and the light source are not mounted, wherein light emitted from the light source is reflected backward by means of two or three reflection surfaces of the reflector and received by the light receiving means, whereby the positional displacement of the measurement object relative to the reference object with respect to two-axis directions in a plane perpendicular to the optical axis of the light emitted from the light source can be measured. Further, the present invention can be applied to any optical displacement sensor with whatever structure disposed between a light receiving means and a light source.

In the first embodiment of the aforementioned Japanese Patent Application No. 2003-299827, as explained with reference to FIG. 7 therein, the direction in which the two reflection surfaces of the reflector oppose each other is set to an intermediate direction oriented so as to make a 45 degree angle to both of the two axes (X-axis and Y-axis) with respect to which displacement is to be detected by an optical sensor unit (optical displacement sensor) thereby enabling the optical sensor unit to detect displacement with respect to the two axes (X- and Y-axes). Accordingly, for example, when the second or third embodiment of the present invention, which leverages the oval-shaped intensity distribution of light emitted from the light source, is applied to the optical displacement sensor employing a reflector with two reflection surfaces as described in the first embodiment of the aforementioned Japanese Patent Application No. 2003-299827, it is preferred that the two symmetry axes of the oval configuration be arranged so as to make a 45 degree angle to the two-axis directions with respect to which displacement is measured by the optical displacement sensor. In this connection, when the second or third embodiment of the present invention is applied to the optical displacement sensor employing a reflector with three reflection surfaces as described in the second embodiment of the aforementioned Japanese Patent Application No. 2003-299827, the axis arrangement described above is not required as understood from FIG. 11 therein.

The present invention can be applied to measurements of various physical quantities detectable on the basis of displacement, in addition to the above-described external force detecting devices such as six-axis force sensors.

While the present invention has been illustrated and explained with respect to specific embodiments thereof, it is to be understood that the present invention is by no means limited thereto but encompasses all changes and modifications that will become possible within the scope of the appended claims.

What is claimed is:

1. An optical displacement sensor comprising:
   a light source disposed at one of a reference object and a measurement object; and
   a light receiving means disposed at the other one thereof at which the light source is not disposed, and functioning to receive light emitted from the light source thereby measuring rotational displacement of the measurement object relative to the reference object with respect to two-axis directions in a plane perpendicular to an optical axis of the light emitted from the light source, wherein the light emitted from the light source, at least when received at the light receiving means, has its intensity distribution shaped in an oval configuration with two symmetry axes oriented so as to match the two-axis directions, respectively, the two symmetry axes including a major axis and a minor axis not equal to the major axis, and wherein light intensity from the light source in a first portion of the light receiving means is compared against light intensity from the light source in a second portion of the light receiving means to enable rotational adjustment of the light receiving means with respect to the light source to achieve alignment about an optical axis.

2. An optical displacement sensor according to claim 1, wherein the light source is constituted by a light emitting diode (LED), and a cylindrical lens is disposed between the LED and the light receiving means whereby the light emitted from the LED has its intensity distribution turned into the oval configuration with two symmetry axes.

3. A method of adjusting an optical displacement sensor which comprises:
   a light source disposed at one of a reference object and a measurement object; and
   a light receiving means disposed at the other one thereof at which the light source is not disposed, and functioning to receive light emitted from the light source thereby measuring displacement of the measurement object relative to the reference object with respect to two-axis directions in a plane perpendicular to an optical axis of the light emitted from the light source, wherein the light emitted from the light source, at least when received at the light receiving means, has its intensity distribution shaped in an oval configuration with two symmetry axes, the method comprising steps of comparing light intensity on a first portion of the light receiving means against light intensity on a second portion of the light receiving means to obtain a reception state, and adjusting a position of the light receiving means relative to the light source with respect to a rotational direction about the optical axis of the light emitted from the light source based on the reception state of the light at the light receiving means.

4. An optical displacement sensor comprising:
   a single undivided light source disposed at one of a reference object and a measurement object; and
   a photodiode assembly divided into four quadrants disposed at the other one thereof at which the light source is not disposed, wherein light emitted from the light source has its intensity distribution shaped in a configuration having a major axis having a first length and a minor axis having a second length different from the first length, the sensor configured to compare the light intensity from the light source in a first portion of the photodiode assembly against the light intensity from the light source in a second portion of the photodiode assembly to enable rotational adjustment of the photodiode assembly with respect to the light source to achieve alignment about an optical axis.

5. The optical displacement sensor of claim 4 wherein each quadrant of the photodiode assembly includes a photodiode.

6. The optical displacement sensor of claim 5 wherein the photodiodes in the four quadrants of the photodiode assembly include a first set of diagonally opposed photodiodes with no adjacent sides and a second set of diagonally opposed photodiodes with no adjacent sides.

7. The optical displacement sensor of claim 6 wherein an angle of rotational adjustment is determined by subtracting the combined light intensity from the light source impinging on the second set of photodiodes from the combined light intensity from the light source impinging on the first set of photodiodes.

8. The Optical displacement sensor of claim 4 further comprising a cylindrical lens disposed between the light source and the photodiode assembly.

9. The Optical displacement sensor of claim 4 wherein the configuration is an elongated oval shape.

* * * * *